(12) United States Patent
Kawase

(10) Patent No.: US 7,274,385 B2
(45) Date of Patent: Sep. 25, 2007

(54) DISPLAY APPARATUS AND METHOD OF USING SAME

(75) Inventor: Syoji Kawase, Aichi-ken (JP)

(73) Assignee: Hagiwara Sys-Com Co., Ltd., Nagoya-shi (JP)

( * ) Notice: Subject to any disclaimer, the term of this patent is extended or adjusted under 35 U.S.C. 154(b) by 0 days.

(21) Appl. No.: 11/092,884

(22) Filed: Mar. 29, 2005

(65) Prior Publication Data

US 2006/0072003 A1   Apr. 6, 2006

(30) Foreign Application Priority Data

Oct. 1, 2004   (JP)   ............................... 2004-290460

(51) Int. Cl.
*H04N 7/14* (2006.01)
(52) U.S. Cl. ................. 348/14.01; 348/14.02
(58) Field of Classification Search .. 348/14.01–14.16; 379/93.17, 93.23
See application file for complete search history.

(56) References Cited

U.S. PATENT DOCUMENTS

| 4,856,045 | A |   | 8/1989  | Hoshina |
| 4,893,326 | A | * | 1/1990  | Duran et al. ............. 348/14.12 |
| 4,928,300 | A |   | 5/1990  | Ogawa et al. |
| 5,963,245 | A | * | 10/1999 | McDonald ............... 348/14.01 |
| D452,222  | S |   | 12/2001 | Lee |
| 6,335,753 | B1 | * | 1/2002 | McDonald ............... 348/14.01 |
| 6,512,919 | B2 |   | 1/2003 | Ogasawara |
| 6,556,235 | B1 |   | 4/2003 | Saburi |
| D478,881  | S  |   | 8/2003 | O'Leary et al. |
| 6,667,759 | B2 | * | 12/2003 | Gerszberg et al. ........ 348/14.01 |
| 6,681,120 | B1 | * | 1/2004 | Kim ........................ 348/14.02 |
| 6,784,916 | B2 | * | 8/2004 | Smith ...................... 348/14.01 |
| D498,736  | S  |   | 11/2004 | Lee |
| 6,909,452 | B1 | * | 6/2005 | Foster et al. ............. 348/14.09 |
| 2004/0041902 | A1 | * | 3/2004 | Washington ............. 348/14.01 |

* cited by examiner

*Primary Examiner*—Stella Woo
(74) *Attorney, Agent, or Firm*—Lowe Hauptman Ham & Berner LLP

(57) ABSTRACT

A housing, formed as a desktop computer or wall-hung display, includes a display screen, a data receiver for receiving audio and video data transmitted from an external device via a public switched telephone network, and a data separator that separates the received data into separated audio data and separated video data. The separated audio data is coupled to a speaker and the separated video data is displayed on the display screen. The housing includes a short range transceiver that couples audio and video data to the separator and a slot for receiving a memory card that supplies audio and video data to the separator. The housing includes an image sensor and microphone for supplying video and audio signals to a combiner that supplies combined audio and video signals to the network, transceiver and card.

7 Claims, 7 Drawing Sheets

DISPLAY APPARATUS AND METHOD OF USING SAME

FIELD OF THE INVENTION

The present invention relates to an image display apparatus capable of providing a variety of attractive applications, and to a method of providing product information using the display apparatus.

BACKGROUND ART

One known method of displaying and playing back video and audio via a public switched telephone network (PSTN) line using electronic media, such as personal computers (PCs) and portable phones, is to use a communication function of such media (see, for example, http://www-6.ibm.com/jp/pc/desktop/index.shtml). Most desktop PCs include a display device, such as a cathode ray tube (CRT), and a central unit processor (CPU). Typically, the display device and CPU are housed in separate units. Most PCs are not easy to use. PCs including a main unit and a display device integrated in a single unit have problems of installation space, usability, etc. PCs, such as notebook PCs, have a space-saving design, but operation thereof is complex when used for multiple applications. Portable phones have a small display screen, making it difficult for a user to view the displayed content. The small display screen can provide only a limited amount of displayed information. The small screens of portable phones also have problems of poor usability and limited display area. Portable videophone devices have larger display areas than portable phones for viewing the expression of the other party. However, portable videophone devices are relatively large, and are frequently specific to one use.

SUMMARY OF THE INVENTION

Accordingly, it is an object of the present invention to provide a new and improved display apparatus having a space-saving design and having a communication function that allows a user to easily access and utilize various applications. It is another object of the present invention to provide a new and improved method of providing product information using the display apparatus.

In one aspect of the present invention, a display apparatus includes a housing, a display screen disposed on a front surface of the housing, a data receiving unit that receives audio and video data transmitted from an external device via a public communication line, and a data separating unit that separates the received data into the audio data and the video data so that the audio data is supplied to a speaker and the video data is supplied to the display screen. The housing is a desktop computer or wall-hung display and houses the data receiving unit and the data separating unit.

In another aspect of the present invention, a display apparatus includes a housing and a display screen disposed on a front surface of the housing, wherein a communication card is removably inserted into a slot that is formed in the housing. The communication card includes a data receiving unit that receives audio and video data transmitted from an external device via a public communication line. The housing includes a data separating unit that is coupled to the communication card in the slot and separates the received data into the audio data and the video data so that the audio data is supplied to a speaker and the video data is displayed on the display screen. The housing is in the form of a desktop computer or wall-hung display.

The display apparatus preferably also includes an image capturing unit that captures video data, a sound collecting unit that collects audio data, a data combining unit that combines the video data captured by the image capturing unit and the audio data collected by the sound collecting unit, and a data transmitting unit that transmits the combined data via a public communication line.

The display apparatus can also include an image capturing unit that captures video data, and a sound collecting unit that collects audio data, and the communication card. The housing further includes a data combining unit that is permanently mounted in the housing and combines the video data captured by the image capturing unit and the audio data collected by the sound collecting unit so that the combined data can be transmitted via a public communication line.

The data receiving unit and the data transmitting unit can be incorporated in a first module, and the data separating unit and the data combining unit can be incorporated in a second module.

The display apparatus can also include an automatic audio and video receiving unit that automatically receives the audio and video data received via the public communication line. The automatically received audio and video data can be stored in a memory card that can be readily inserted in and removed from a slot of the display apparatus.

The display screen is typically any one of a liquid crystal display panel, a plasma display panel, an electroluminescent display panel, and a surface-conduction electron-emitter display panel.

The public communication line can be a mobile communication network. The data receiving unit can receive data using a mobile communication, and the data transmitting unit may transmit data using a mobile communication.

In another aspect of the present invention, a method of providing product information includes the steps of capturing an image and collecting sound on a portable phone equipped with a charge-coupled-device image sensor, storing the captured image and the collected sound in a memory card that is inserted in the portable phone, connecting the memory card to a display apparatus, transmitting the data stored in the memory card to another party by designating a telephone number of the another party, and automatically storing the transmitted data in a memory card that is inserted in a display apparatus in the possession of the other party.

In another aspect of the present invention, a method of providing product information includes the steps of: (1) capturing an image and collecting sound on a portable phone equipped with a charge-coupled-device image sensor, (2) wirelessly transmitting (to a display apparatus that is close to the portable phone) the captured image and the collected sound from a data transfer unit that is in the portable phone, (3) storing the transmitted data in a memory card that is inserted in the display apparatus, (4) transmitting the data stored in the memory card by designating a telephone number of another party, and (5) automatically storing the transmitted data in a memory card that is inserted in a display apparatus operated by the other party.

As a result of certain features of the present invention, a novel display apparatus is provided having a space-saving design and having a communication function that allows a user to easily access and utilize various applications. A novel method of providing product information using the display apparatus is also achieved.

DETAILED DESCRIPTION OF THE DRAWINGS

A display apparatus according to preferred embodiments of the present invention is now described with the drawings.

Figure 1A:
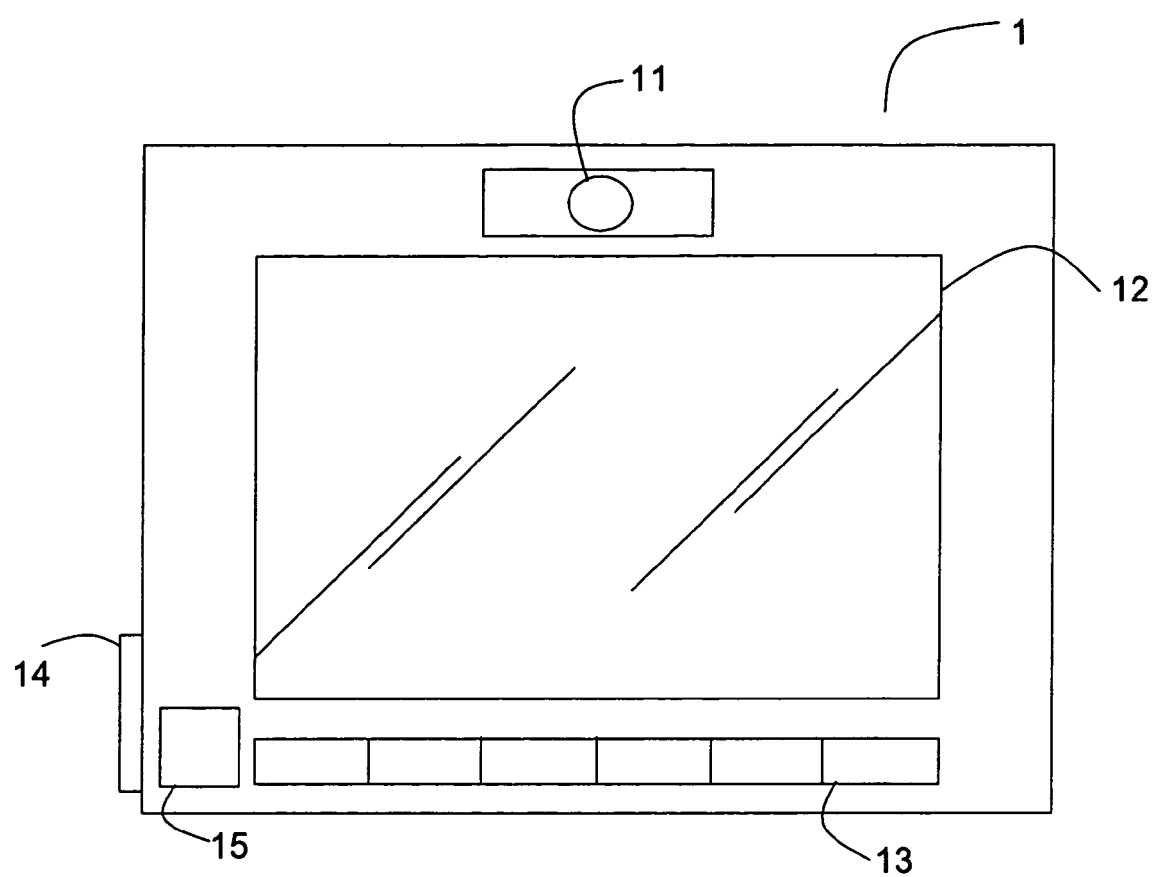
FIGS. 1A, 1B, and 1C are respectively front, side, and rear views of a display apparatus of a preferred embodiment of the present invention.
Figure 1B:
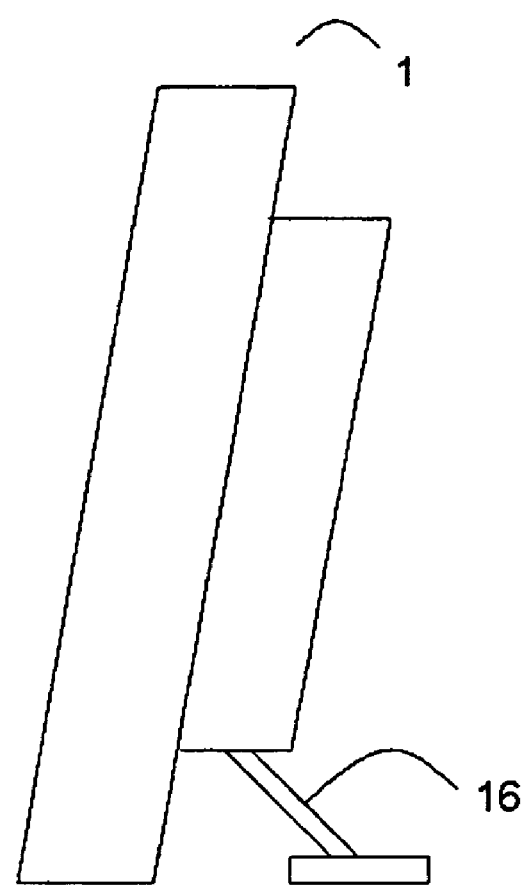
Figure 1C:
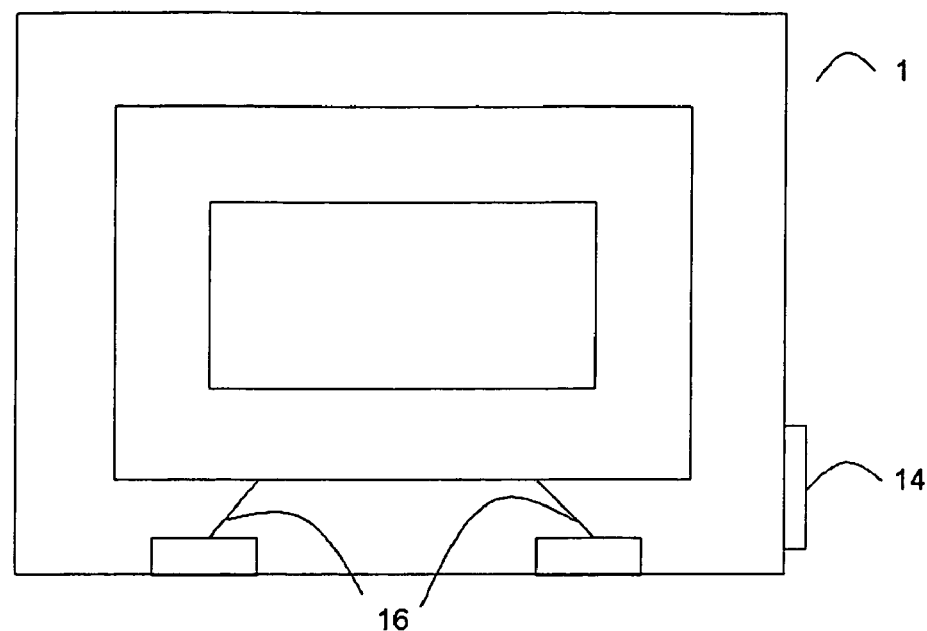

FIG. 1A is a front view of a display apparatus 1. As shown in FIG. 1A, a display area of a liquid crystal display (LCD) panel 12 is located at the front of the display apparatus 1. Below panel 12 is a control panel 13 including several "buttons" that can be used by a user to perform various operations. A charge-coupled device (CCD) image sensor 11 of the type employed in digital cameras is located equidistant from the vertical edges of display apparatus 1, above display screen 12. If desired, a shutter and shutter release mechanism, similar to these employed in digital cameras, can be associated with CCD image sensor 11. The display apparatus 1 contains speaker 16 (sound output device) and microphone (sound collecting device) 17. As shown, in FIG. 1B, the display apparatus 1 is a flat display having legs (or a display stand) 116 at the rear face of the display apparatus 1 for allowing the display apparatus 1 to stand on a desk in the manner shown in FIG. 1C.

Figure 2:
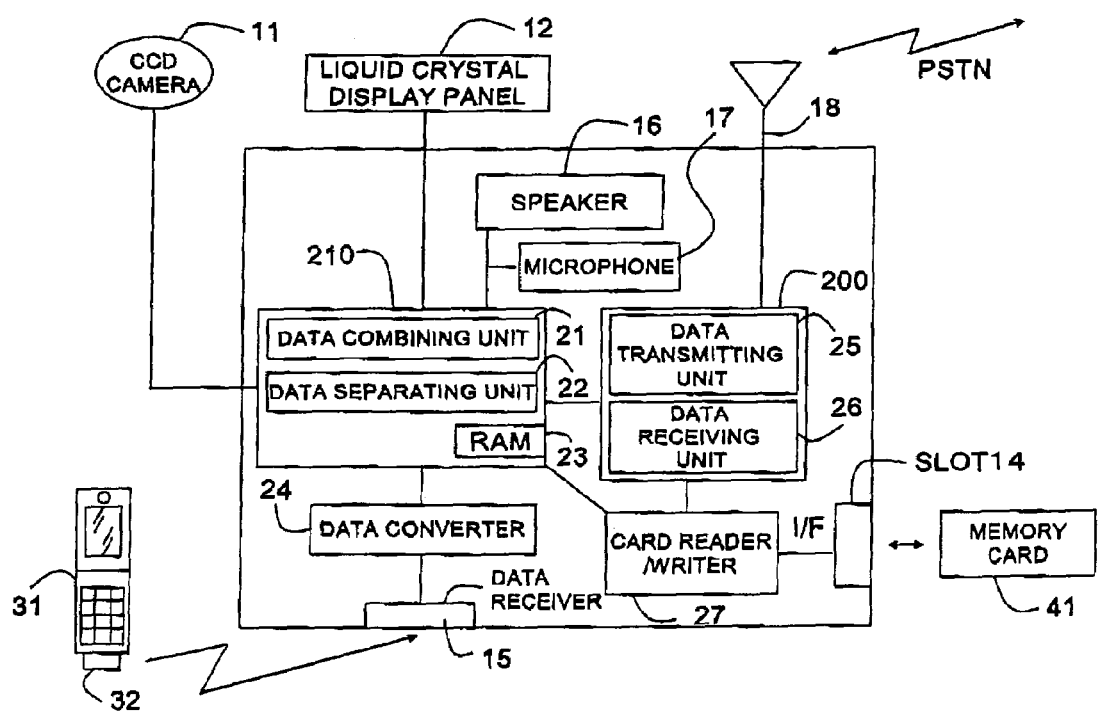
FIG. 2 is a block diagram of one preferred embodiment of the display apparatus of the present invention.

FIG. 2 is a block diagram of the display apparatus 1 of FIG. 1.

The display apparatus 1 includes the LCD panel 12, the CCD image capturing device 11, a speaker 16, and a microphone 17 serving as a sound collecting device. The display apparatus 1 further includes controllers, including a data receiving unit 26 that receives audio and video data transmitted from an external device via a public switched telephone network (PSTN), a data separating unit 22 that separates the received data into the audio data, which is output from the speaker 16, and the video data, which is displayed on the display screen, a data combining unit 21 that combines video data captured by the CCD 11 and audio data collected by the microphone 17, and a data transmitting unit 25 that transmits the combined data via a PSTN. The data receiving unit 26 and the data transmitting unit 25 are included in a first module 200, and the data separating unit 22 and the data combining unit 21 are included in a second module 210. The term PSTN refers to a public communication line that carries video and audio data by designating the telephone number of the other party.

The data receiving unit 26 converts the data transmitted according to a predetermined communication protocol from the PSTN into a data format handled by the data separating unit 22. The data transmitting unit 25 converts the combined audio and video data derived from the data combining unit 21 into a data format transmitted according to the communication protocol of the PSTN. The data receiving unit 26 can include a time-shift recording function (an auto-answering function). In FIG. 2, data is wirelessly transmitted to and received from the PSTN via an antenna 18 using a mobile communication network, e.g. a cellular telephone network.

The display apparatus 1 further includes a slot 14 into which is inserted and removed a memory card 41 having audio and video data. While the memory card 41 is inserted in the slot 14, the memory card 41 is electrically connected to the internal circuit of the display apparatus 1 via a memory interface I/F. The memory card 41 can be, e.g., a postage stamp-sized flash memory card of the type known as a Secure Digital Card (SD). The audio and video data stored in the memory card 41 can be data recorded in response to (a) the output signals of CCD 11 and the microphone 17 of the display apparatus 1 or (b) data transmitted from an external device.

A card reader/writer 27 writes data to the memory card 41, and reads the data stored in the memory card 41.

In the embodiment described above, the image capturing device 11 and the sound collecting device 17 are housed in the display apparatus; alternatively, an external device, e.g., a camera-equipped portable phone 31, can be used to supply audio and video data to display apparatus 1. In the alternative, wireless case, a data transfer unit 32 is attached to the camera-equipped portable phone 31 for transferring data from the camera-equipped portable phone 31 to the display apparatus 1. The display apparatus 1 includes a wireless data receiver 15 and a data converter 24 for converting the data received by the data receiver 15 into a format that can be stored in a random-access memory (RAM) 23 that is disposed in the second module 210. The data can be transferred between unit 32 and receiver 15 via short-range data communication waves, such as infrared waves or r.f. waves, such as employed in Bluetooth.\

Figure 3:
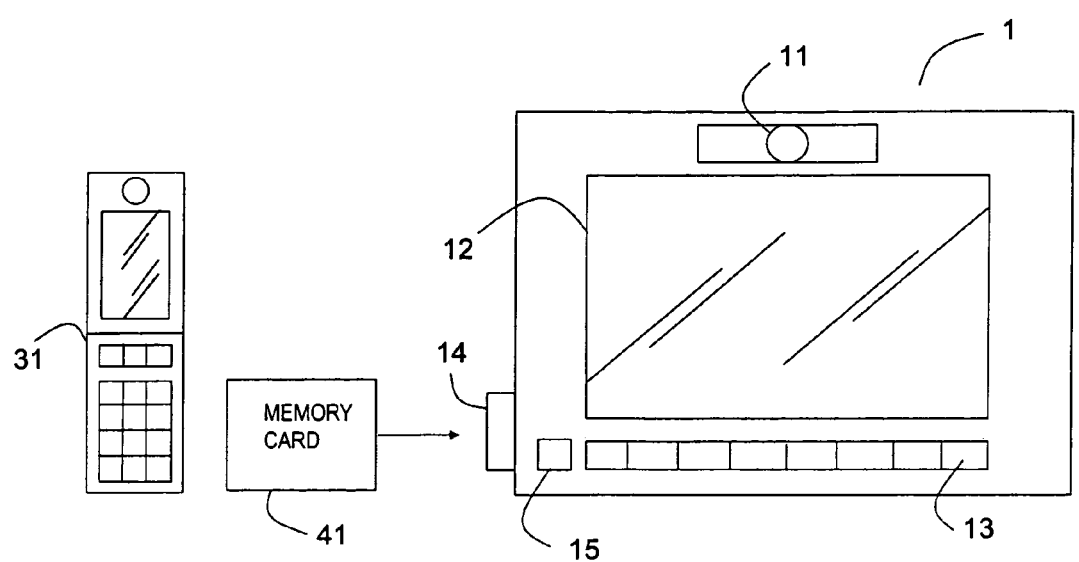
FIG. 3 is a schematic diagram of a use of the display apparatus of the present invention.

As shown in FIG. 3, data can be recorded in the memory card 4 by inserting the card in a suitable slot of camera-equipped portable phone 31. The memory card 41 is then inserted into the memory card slot 14 in the display apparatus 1 for reading the audio and video data on the card by card reader/writer 27. The memory card 41 inserted into the slot of the camera-equipped portable phone must be capable of being inserted into the slot 14 and inserted and read by card reader/writer 27 of display apparatus 1.

Preferably, the display apparatus 1 has a telephone answering function for automatically answering a call whenever the user is absent from or unable to answer the call and for automatically recording data, including video data, in the memory card 41.

Figure 5:
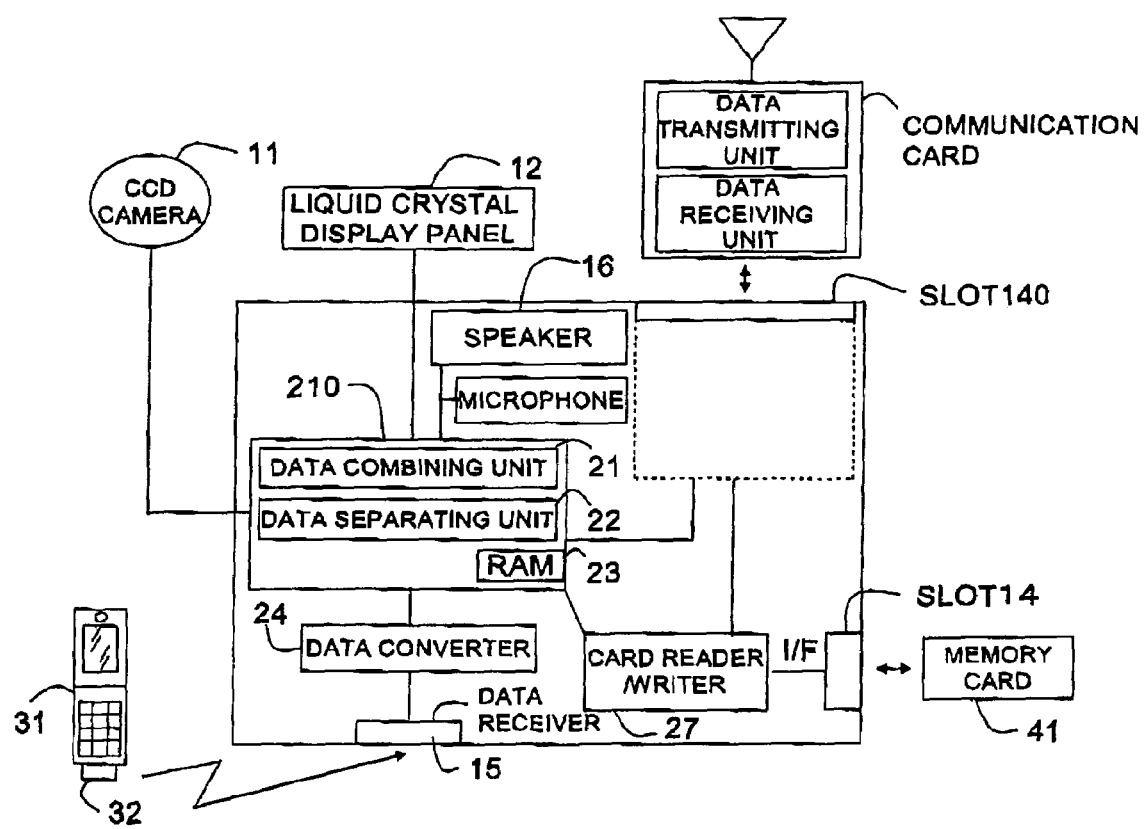
FIG. 5 is a block diagram of another preferred embodiment of the display apparatus of the present invention.

In the display device of FIG. 5, a communication card 120 replaces module 200 of FIG. 2. Card 120 includes (1) data receiving unit 26 that receives a composite signal including audio and video data transmitted from an external device via a PSTN, and (2) data transmitting unit 25 that transmits a combined audio and video signal from data combining unit 21 to the PSTN. Receiving unit 26 supplies a composite audio and video signal to data separating unit 22 that is permanently mounted in the housing of display apparatus and respectively supplies audio and video signals to speaker 16 and display panel 12. Communication card 120 is, e.g., a FOMA Module Card, available from NTT DOCOMO. Because card 120 can be inserted into and removed from display apparatus 1 via slot 140, the card can be used on other similar devices.

The display apparatus 1 can be any flat panel display, such as, but not limited to, a liquid crystal display, a plasma display, an electroluminescent display, or a surface conduction electron-emitter display.

If the camera-equipped portable phone 31 is used for image capturing and sound collection, the CCD image sensor 11 of the display apparatus 1 can be eliminated.

The display apparatus 1 including the CCD image sensor 11, display panel 12, speaker 16 and microphone 17 can be used as a face-to-face video telephone between users. The microphone 17 and the speaker 16 built into the display apparatus 1 enable hands-free conversation without a receiver. If one communication party uses a camera-equipped portable phone, the display apparatus 1 on the receiver side provides a larger display area than that of the portable phone, thus enabling details of the other communication party to be viewed in more detail. Once the transmitted video (moving pictures) is stored in the memory card 41, the video can be played back together with audio. In this use, persons and things at a remote place can be viewed on a large screen many times, which is more usable than transmission of video letters.

Figure 4:
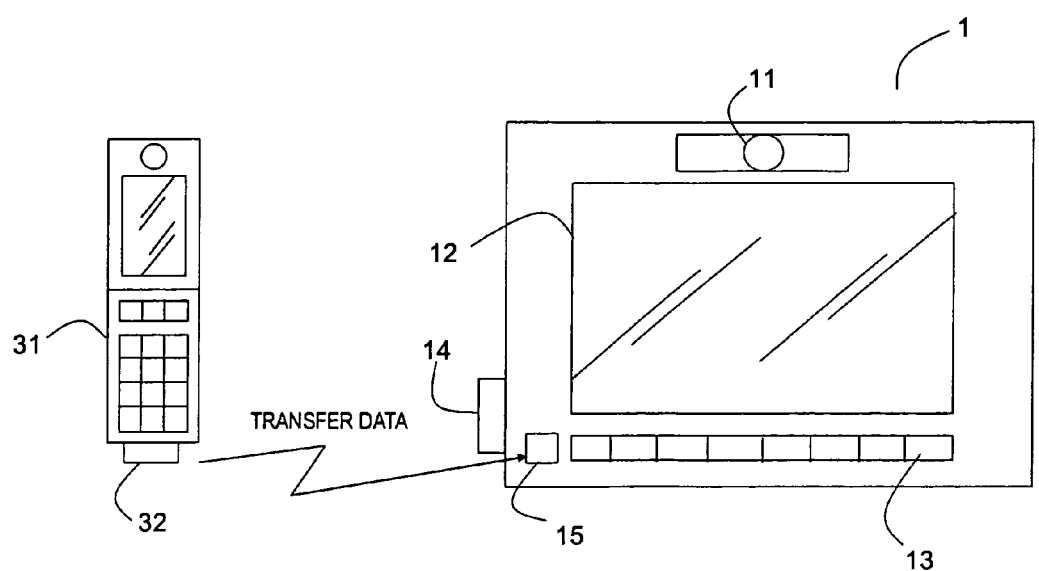
FIG. 4 is of schematic diagram of another use of the display apparatus of a preferred embodiment of the present invention.

The camera-equipped portable phone 31 can also be used as an image capturing device and a sound collecting device. For example, in order to provide product information to customers, a salesperson in a shop first records video and audio data of the name, price, etc., of products in the shop onto the memory card 41 inserted in the portable phone 31. Then, the salesperson removes the memory card 41, and inserts the card into the memory card slot 14 in the display apparatus 1. The salesperson then calls the display apparatus 1 of a customer who is contacted in advance, and transmits the product information read from the memory card 41 via a public switched telephone network. If the customer is absent or unable to answer the call, the telephone answering function described above is used to store the product information in a memory card inserted in the display apparatus 1 of the customer. Thus, the customer is able to receive the product information at the leisure of the customer, and is therefore encouraged to make a purchase. This service can be made available to customers and prospective customers as electronic advertisements. In this use, images captured and sound collected by an external device (e.g., the camera-equipped portable phone 31) are stored in the memory card 41, thus providing less restriction on the data recording space. The data obtained using the camera-equipped portable phone 31 can be stored in the memory card 41 of the display apparatus 1 via short-range wireless carriers, such as infrared waves or radio waves, from the camera-equipped portable phone 31, as described above (see FIG. 4). This service is not feasible on traditional portable videophones.

A moving image captured by the camera-equipped portable phone 31 or a still image transmitted from another user can be displayed on the display apparatus 1. The display apparatus 1 can also be used as an electronic photo stand.

The display apparatus 1 can also be a wall-hung display. This type of display enables voices and images of people to be transmitted to another party. Any image (e.g., a seasonal still image scene) stored in advance in the memory card 41 can be displayed on the display apparatus 1, and the display apparatus 1 can be used as an electronic ornament. The display apparatus 1 can continuously display moving pictures and sound at predetermined time intervals. Moving picture scenes, e.g., a babbling stream, rippling waves, bamboo trees swinging in the wind, etc., can give a feeling of the season, or a specific mood or atmosphere.

What is claimed is:

1. An apparatus for use with a communication card including a receiver for receiving audio and video data of the type that is transmitted via a public communication line, the apparatus comprising:
   a housing in the form of a desktop display or a wall-hung display; and
   a display screen disposed on a front surface of the housing, the housing including a slot for receiving and reading information on the communication card while the card is installed in the slot, the slot being arranged for enabling the card to be easily inserted manually into and removed from the slot without using tools, the slot including a signal pickup arrangement for coupling the received audio and video data to a data separator permanently mounted in the housing; the data separator being arranged for separating the received audio and video data into separated audio data and separated video data for causing the separated video data to be displayed on the display screen and the separated audio data to be supplied to a speaker while the card is inserted in the slot, the housing including another slot for receiving a semiconductor memory card for storing audio and video data, the housing including an interface for supplying the audio and video data stored on the memory card to the data separator while the memory card is inserted into the another slot.

2. The apparatus of claim 1, wherein the housing includes a data receiver arrangement for receiving a short range wireless communication including audio and video data and for coupling the audio and video data received via the short range wireless communication to a data converter.

3. The apparatus of claim 2, wherein the housing includes an image capturing device for capturing video data and a sound collector for collecting audio data, the housing further including:
   a data combiner for combining the video data captured by the imaging device and the audio data collected by the sound collector for coupling the combined data to the communication card;
   the communication card including a data transmitter for transmitting the combined data via a public communication line while the communication card is disposed in the slot.

4. The apparatus of claim 1 wherein the housing includes an image capturing device for capturing video data and a sound collector for collecting audio data, the housing further including:
   a data combiner for combining the video data captured by the imaging device and the audio data collected by the sound collector for coupling the combined data to the communication card;
   the communication card including a data transmitter for transmitting the combined data via a public communication line while the communication card is disposed in the slot.

5. A method of providing product information, comprising the steps of:
   capturing an image about the product and collecting sound about the product on an image sensor and sound transducer of a portable phone;
   storing the captured image and the collected sound in a first memory card inserted in the portable phone;
   thereafter, inserting the memory card in a first slot of a first apparatus; transmitting from the first apparatus to a second apparatus the data stored in the first memory card by using a public communication line and by designating a telephone number of the second apparatus; and at the second apparatus: (a) receiving the data transmitted to the second apparatus; (b) automatically storing the received data transmitted from the first apparatus via the public communication line, the data being automatically stored in a second memory card operatively inserted in a slot of the second apparatus; the first and second memory cards being such that they can be easily manually inserted into and removed from the first and second slots without the use of tools; (c) separating data received by the second card while the second card is operatively disposed in the second slot into audio data commensurate with the sound about the product and video data commensurate with the image about the product; the data separating step being performed by a data separator at the second apparatus; coupling the audio data and the video data separated by the data separator to a speaker and display screen of the second apparatus so the separated audio data are coupled to the speaker and the separated video data are displayed on the display screen; the display screen being in a first housing hung on a wall where the second apparatus is located or on a front face of a second housing where the second apparatus is located, the second housing being located in a generally vertically extending plane or being set on a horizontal surface.

6. A method of providing product information, comprising the steps of:

capturing an image about the product and collecting sound about the product on an image sensor and a microphone of a portable phone;

wirelessly transmitting the captured image about the product and the collected sound about the product, the wireless transmitting being via a short range link from the phone to a receiver of a first apparatus;

at the first apparatus: (a) receiving the image and sound transmitted from the phone; (b) storing the image and sound transmitted from the phone in a first memory card that is inserted in a first slot of the first apparatus; (c) transmitting to a second apparatus the data stored in the first memory card by using a public communication line and by designating a telephone number of the second apparatus; and at the second apparatus: (a) receiving the data transmitted to the second apparatus; (b) automatically storing the received data transmitted from the first apparatus via the public communication line, the data being automatically stored in a second memory card operatively inserted in a second slot of the second apparatus; the first and second memory cards being such that they can be easily manually inserted into and removed from the first and of the second slots without the use of tools; (c) separating data received by the second card while the second card is operatively disposed in the second slot into audio data commensurate with the sound about the product and video data commensurate with the image about the product; the data separating step being performed by a data separator at the second apparatus; coupling the audio data and the video data separated by the data separator to a speaker and display screen of the second apparatus so the separated audio data are coupled to the speaker and the separated video data are displayed on the display screen; the display screen being in a housing hung on a wall where the second apparatus is located or on a front face of a desk-top computer where the second apparatus is located.

7. The method of claim 6 wherein the second card includes a data receiver for receiving the audio and video data transmitted from via the public communication line; the method further comprising coupling the data receiver of the second card with the public communication line; and while the receiver of the second card is coupled with publication communication line, causing the receiver of the second card to receive audio and video data transmitted from the first apparatus to the second apparatus via the public communication line.

* * * * *